United States Patent
Hu et al.

(10) Patent No.: US 12,195,073 B2
(45) Date of Patent: Jan. 14, 2025

(54) PRESSURE SENSING DEVICE, 3D GESTURE CONTROL SYSTEM AND VEHICLE CONTROL SYSTEM

(71) Applicant: PixArt Imaging Inc., Hsin-Chu (TW)

(72) Inventors: Chin-Hua Hu, Hsin-Chu (TW); Yu-Han Chen, Hsin-Chu (TW); Yu-Sheng Lin, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 38 days.

(21) Appl. No.: 17/857,194

(22) Filed: Jul. 5, 2022

(65) Prior Publication Data
US 2024/0010262 A1   Jan. 11, 2024

(51) Int. Cl.
*B62D 1/04* (2006.01)
*G06F 3/044* (2006.01)
*G06F 3/0488* (2022.01)

(52) U.S. Cl.
CPC ........... *B62D 1/046* (2013.01); *G06F 3/0443* (2019.05); *G06F 3/0488* (2013.01); *G06F 2203/04105* (2013.01)

(58) Field of Classification Search
CPC .................................. B62D 1/046; B62D 1/06
See application file for complete search history.

(56) References Cited

U.S. PATENT DOCUMENTS

| | | |
|---|---|---|
| 9,552,118 B2 | 1/2017 | Liao |
| 9,746,980 B2 | 8/2017 | Liao |
| 10,114,513 B2 | 10/2018 | Staszak |
| 10,370,019 B2 | 8/2019 | Michelmann |
| 10,698,544 B2 | 6/2020 | Staszak |
| 10,953,908 B1 | 3/2021 | Ahn |
| 11,029,438 B2 | 6/2021 | Takamatsu |
| 11,032,875 B2 | 6/2021 | Lisseman |
| 11,299,191 B2 | 4/2022 | Van'tZelfde |
| 11,565,738 B2 | 1/2023 | Zoppas |
| 11,599,226 B2 | 3/2023 | Staszak |
| 2013/0126325 A1 | 5/2013 | Curtis |
| 2013/0234977 A1 | 9/2013 | Lin |

(Continued)

FOREIGN PATENT DOCUMENTS

| | | | |
|---|---|---|---|
| CN | 101458133 | 6/2009 | |
| CN | 102339179 | 2/2012 | |
| CN | 105988635 A | * 10/2016 | ........... G06F 3/0416 |

*Primary Examiner* — Daniel D Yabut
(74) *Attorney, Agent, or Firm* — Winston Hsu

(57) ABSTRACT

A pressure sensing device, comprising: a frame work; a capacitive pressure sensor layer, surrounding the frame work; a capacitive touch sensor layer; and a flexible material layer, located between the pressure sensor layer and the touch sensor layer and surrounding the capacitive pressure sensor layer. The capacitive touch sensor layer is above the flexible material layer when the capacitive pressure sensor layer is below the flexible material layer. The capacitive touch sensor layer has a first driving electrode and a first sensing electrode. The capacitive pressure sensor layer has a second driving electrode and a second sensing electrode. A 3D gesture control system and a vehicle control system applying the pressure sensing device are also disclosed. Via the pressure sensing device, the 3D gesture control system and the vehicle control system can generate control commands according to a touch or a pressure provided by a user.

18 Claims, 9 Drawing Sheets

(56) References Cited

U.S. PATENT DOCUMENTS

| | | | | |
|---|---|---|---|---|
| 2014/0156107 A1* | 6/2014 | Karasawa | .......... | G01C 21/3664 |
| | | | | 701/1 |
| 2015/0369633 A1 | 12/2015 | Karasawa | | |
| 2019/0094967 A1* | 3/2019 | Bisbee | .................... | G06F 3/016 |
| 2019/0317641 A1* | 10/2019 | Maruyama | ............ | G06F 3/0446 |
| 2019/0339412 A1* | 11/2019 | Takamatsu | .............. | B32B 27/12 |
| 2020/0150826 A1* | 5/2020 | Hwang | ............... | G06F 3/04144 |
| 2021/0152175 A1* | 5/2021 | Buttolo | ................ | H03K 17/955 |
| 2021/0206418 A1* | 7/2021 | Nakano | ................... | B32B 27/34 |
| 2021/0362767 A1* | 11/2021 | Minoshima | .............. | G01V 3/08 |
| 2022/0048552 A1* | 2/2022 | Salter | .................. | B60K 35/00 |
| 2022/0073122 A1* | 3/2022 | Salter | .................. | H05B 1/0236 |

\* cited by examiner

PRESSURE SENSING DEVICE, 3D GESTURE CONTROL SYSTEM AND VEHICLE CONTROL SYSTEM

BACKGROUND OF THE INVENTION

1. Field of the Invention

The present invention relates to a pressure sensing device, a 3D gesture control system and a vehicle control system, and particularly relates to a pressure sensing device, a 3D gesture control system and a vehicle control system which can sense touch and pressure provided by a user.

2. Description of the Prior Art

A conventional vehicle control device such as a steering wheel may have a HOD (Hand Off Detection) function, which can prevent the driver from falling asleep while driving or help assist the driver in autopilot. However, such conventional steering wheel always can only sense touch and could not sense any other kind of command from the user, thus the applications thereof are limited.

Accordingly, a new vehicle control device is needed.

SUMMARY OF THE INVENTION

One objective of the present invention is to provide a pressure sensing device which has a touch sensing function.

Another objective of the present invention is to provide a 3D gesture control system which can generate a control command according to a touch or a pressure provided by a user.

Another objective of the present invention is to provide a vehicle control system which can generate a control command according to a touch or a pressure provided by a user.

One embodiment of the present invention provides a pressure sensing device, comprising: a frame work; a capacitive pressure sensor layer, surrounding the frame work; a capacitive touch sensor layer; and a flexible material layer, located between the pressure sensor layer and the touch sensor layer and surrounding the capacitive pressure sensor layer. The capacitive touch sensor layer is above the flexible material layer when the capacitive pressure sensor layer is below the flexible material layer. The capacitive touch sensor layer has at least one first driving electrode and at least one first sensing electrode. The capacitive pressure sensor layer has at least one second driving electrode and at least one second sensing electrode.

Another embodiment of the present invention provides a 3D gesture control system, comprising: a frame work; a capacitive pressure sensor layer, surrounding the frame work, configured to generate a pressure sensing signal; a capacitive touch sensor layer, configured to generate a touch sensing signal; a flexible material layer, located between the pressure sensor layer and the touch sensor layer and surrounding the capacitive pressure sensor layer; and a processing circuit, configured to generate a control command according to at least one of the touch sensing signal and pressure sensing signal. The capacitive touch sensor layer is above the flexible material layer when the capacitive pressure sensor layer is below the flexible material layer. The capacitive touch sensor layer has at least one first driving electrode and at least one first sensing electrode. The capacitive pressure sensor layer has at least one second driving electrode and at least one second sensing electrode.

Still another embodiment of the present invention discloses a vehicle control system for a vehicle, comprising a vehicle control device. The vehicle control device comprises: a frame work; a capacitive pressure sensor layer, surrounding the frame work, configured to generate a pressure sensing signal; a capacitive touch sensor layer, configured to generate a touch sensing signal; and a flexible material layer, located between the pressure sensor layer and the touch sensor layer and surrounding the capacitive pressure sensor layer; and a processing circuit, configured to generate a control command according to at least one of the touch sensing signal and pressure sensing signal. The control command is applied for controlling a device of the vehicle. The capacitive touch sensor layer is above the flexible material layer when the capacitive pressure sensor layer is below the flexible material layer. The capacitive touch sensor layer has at least one first driving electrode and at least one first sensing electrode. The capacitive pressure sensor layer has at least one second driving electrode and at least one second sensing electrode.

In view of above-mentioned embodiments, the steering wheel has an extended application since it can sense pressure and touch rather than only touch.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. In following embodiments, the terms "first", "second", "third" in descriptions are only for the purpose of distinguishing different one elements, and do not mean the sequence of the elements. For example, a first device and a second device only mean these devices can have the same structure but are different devices. Also, in following embodiments, a steering wheel is provided as an example for explaining the concepts of the present invention. However, the concepts of the present invention can be implemented to any other vehicle control device of a vehicle. Further, the vehicle in following embodiments is a car, but not limited.

Figure 1:
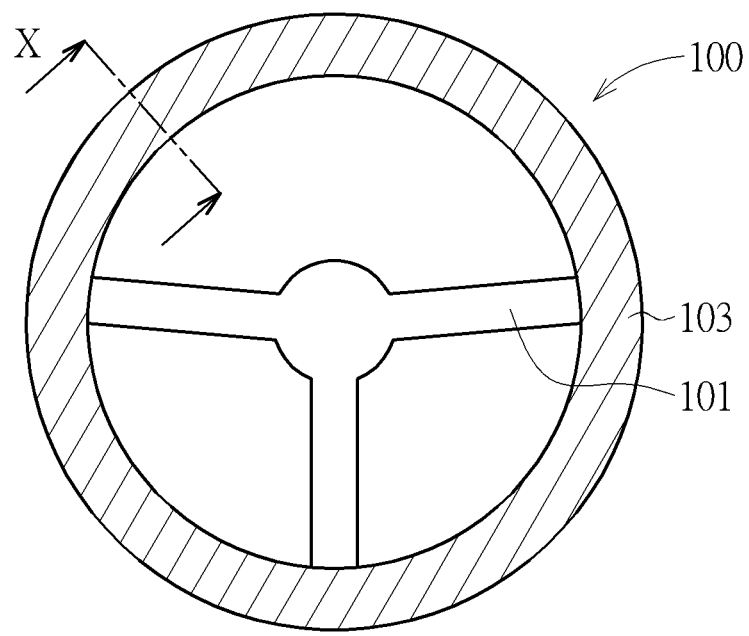
FIG. 1 is a schematic diagram illustrating a vehicle control system according to one embodiment of the present invention.
Figure 1:
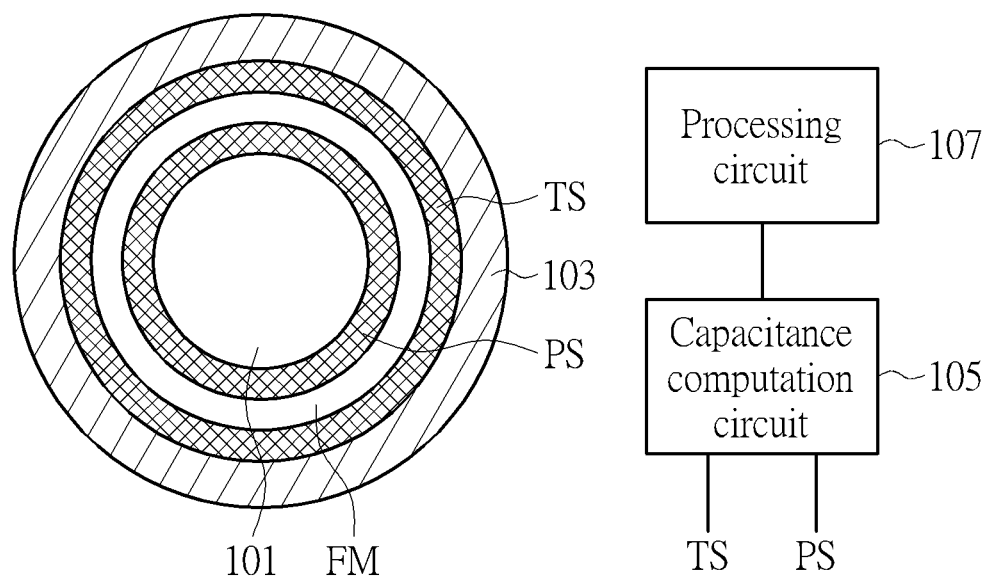

FIG. 1 is a schematic diagram illustrating a vehicle control system according to one embodiment of the present invention. The lower diagram in FIG. 1 is a cross sectional view following an X direction of the upper diagram in FIG. 1. As illustrated in the upper diagram of FIG. 1, the vehicle control system provided by the present invention comprises a steering wheel 100 which comprises a frame work 101 and a covering material 103. The covering material 103, which can be leather or plastic, is the outermost layer of the steering wheel 100.

As shown in the lower diagram of FIG. 1, besides the framework 101 and the covering material 103, the steering wheel 100 further comprises a capacitive touch sensor layer TS, a capacitive pressure sensor layer PS and a flexible material layer FM. The capacitive pressure sensor layer PS is surrounding the frame work 101, and is configured to generate a pressure sensing signal. The flexible material layer FM such as polyurethane or any other flexible material, is located between the capacitive pressure sensor layer PS and the capacitive touch sensor layer TS, and surrounding the capacitive pressure sensor layer PS. In other words, the capacitive touch sensor layer TS is above the flexible material layer FM when the capacitive pressure sensor layer PS is below the flexible material layer FM. The capacitive touch sensor layer TS is configured to generate a touch sensing signal.

The vehicle control system further comprises a capacitance computation circuit 105 and a processing circuit 107. The processing circuit 107 can be a processor of the vehicle using the steering wheel 100, and the capacitance computation circuit 105 can be integrated to the processing circuit 107. Also, the capacitive touch sensor layer TS has at least one first driving electrode and at least one first sensing electrode. Besides, the capacitive pressure sensor layer PS has at least one second driving electrode and at least one second sensing electrode. The capacitance computation circuit 105 generates driving signals to the first driving electrode of the capacitive touch sensor layer TS and senses capacitance information from/through the first sensing electrode (i.e., the touch sensing signal). Similarly, the capacitance computation circuit 105 generates driving signals to the second driving electrode of the capacitive pressure sensor layer PS and senses capacitance information from/through the second sensing electrode (i.e., the pressure sensing signal).

The processing circuit 107 is configured to generate a control command according to at least one of the touch sensing signal and pressure sensing signal. For example, the processing circuit 107 generates the control command according to the touch sensing signal, or generates the control command according to the touch sensing signal and pressure sensing signal. The control command is applied for controlling a device of the vehicle using the steering wheel 100.

In one embodiment, the first driving electrode and the first sensing electrode are coupled to a first predetermined voltage level when the capacitive pressure sensor layer PS performs a sensing operation. The sensing operation means the capacitance computation circuit 105 transmits driving signals to the second driving electrode of the capacitive pressure sensor layer PS, and senses capacitance information from/through the second sensing electrode. Following the same rule, the second driving electrode and the second sensing electrode are coupled to a second predetermined voltage level when the capacitive touch sensor layer TS performs a sensing operation. The sensing operation means the capacitance computation circuit 105 transmits driving signals to the first driving electrode of the capacitive touch sensor layer TS, and senses capacitance information from/through the first sensing electrode. The first predetermined voltage level and the second predetermined voltage level can be identical, but can be different as well. In one embodiment, the first predetermined voltage level and the second predetermined voltage level are both at a ground level, which is used for the whole vehicle.

Briefly, when the capacitance computation circuit 105 senses the capacitance of the capacitive touch sensor layer TS, the capacitive pressure sensor layer PS is coupled to a predetermined voltage level such as a ground to operate as an active shielding layer. The active shielding layer can prevent a layer which is performing sensing operations from being interfered by another layer or another circuit. Following the same rule, when the capacitance computation circuit 105 senses the capacitance of the capacitive pressure sensor layer PS, the capacitive touch sensor layer TS is coupled to a predetermined voltage level such as a ground to operate as an active shielding layer.

The capacitance of the first sensing electrode of the capacitive touch sensor layer TS changes if the user touches the steering wheel 100. Also, the capacitance of the second sensing electrode of the capacitive pressure sensor layer PS changes if the user presses (or clench) the steering wheel 100. For more details, in one embodiment, if the user's hand is away from the steering wheel for a long distance, the user's hand does not cause variation to the capacitance of the second sensing electrode of the capacitive pressure sensor layer PS. If a user presses or clenches the steering wheel 100, a distance between the user's hand and the capacitive pressure sensor layer PS changes, thus the capacitive pressure sensor layer PS may respond to the existence of the hand. After that, since the capacitive touch sensor layer TS has a specific voltage level (e.g., the above-mentioned second predetermined voltage level) and a distance between the capacitive touch sensor layer TS and the capacitive pressure sensor layer PS changes due to the flexible material layer FM which exists between the capacitive touch sensor layer TS and the capacitive pressure sensor layer PS, the capacitance of the capacitive pressure sensor layer PS changes. Therefore, the processing circuit 107 can generate a control command according to whether the steering wheel is touched or pressed.

Figure 2:
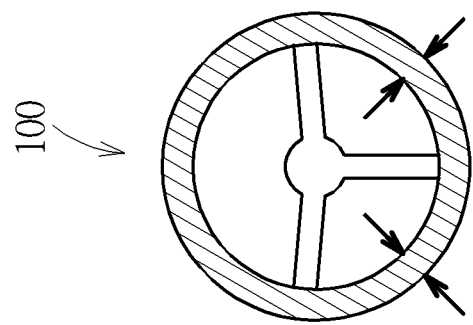
FIG. 2, FIG. 3 and FIG. 4 are schematic diagrams illustrating 3D gestures provided to the steering wheel according to different embodiments of the present invention.
Figure 2:
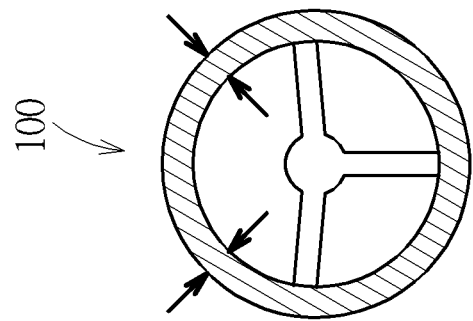
Figure 3:
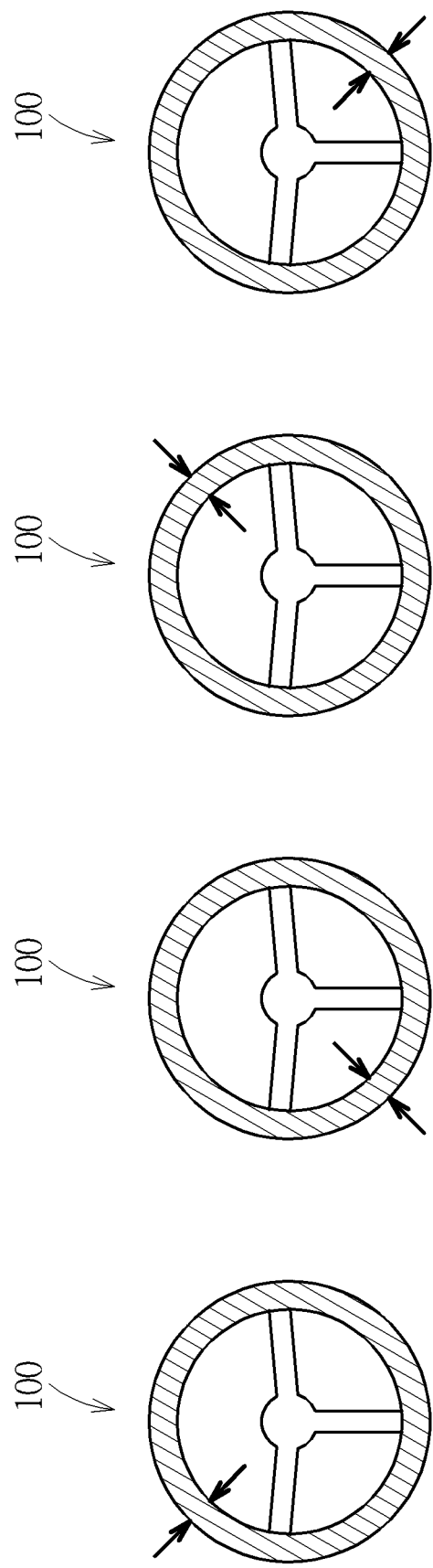
Figure 4:
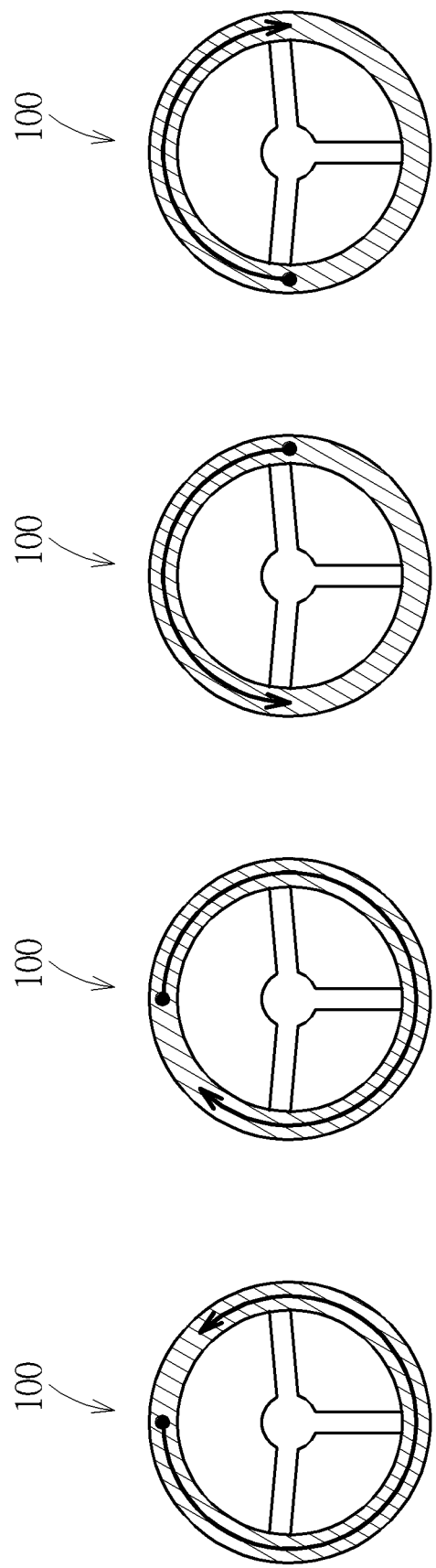

As above-mentioned, the processing circuit 107 generates a control command according to whether the steering wheel is touched or pressed. FIG. 2, FIG. 3 and FIG. 4 are schematic diagrams illustrating 3D gestures provided to the steering wheel according to different embodiments of the present invention. As shown in FIG. 2, the user clenches the steering wheel 100 by two hands at different locations, and the processing circuit 107 correspondingly generates the control command. Also, in the embodiment of FIG. 3, the user clenches the steering wheel 100 by one hand at different locations, and the processing circuit 107 correspondingly generates the control command. Additionally, in the embodiment of FIG. 4, the hand of the user moves on the steering wheel 100 for different directions or ranges, and the processing circuit 107 correspondingly generates the control command.

As above-mentioned, the control command is applied for controlling a device of a vehicle, such as a lamp, a wiper, a seat, or the steering wheel itself. Further, in one embodiment, the processing circuit 107 generates the control command according to at least one of following parameters: a location at which a hand presses the vehicle control device, a location at which the hand touches the vehicle control device, a time interval during which the hand presses the vehicle control device, a time interval during which the hand touches the vehicle control device, a moving direction of the hand on the vehicle control device, and a pressure level that the hand provides to the vehicle control device.

An example for "a time interval during which the hand presses the vehicle control device" is that the user touches the steering wheel for 3 seconds. Also, an example for "a time interval during which the hand touches the vehicle control device" is that the user presses or clenches the user touches the steering wheel for 3 seconds.

The above-mentioned devices and parameters can generate various combinations. For example, in one embodiment, the user applies the gesture illustrated in FIG. 2 to control the vehicle to flash yellow light. Also, in another embodiment, the user uses the gesture illustrated in FIG. 4 to control the turn signal of the vehicle. In still another embodiment, the user uses the gesture illustrated in FIG. 3 to control the wiper, a location or a tilt angle of a seat, or a location of steering wheel. In one embodiment, the processing circuit 107 further generates the control command according to a gear of the vehicle. For example, the user can change a location of the seat or the steering wheel only when the vehicle is in a park gear (P gear) or a neutral gear (N gear).

Figure 5:
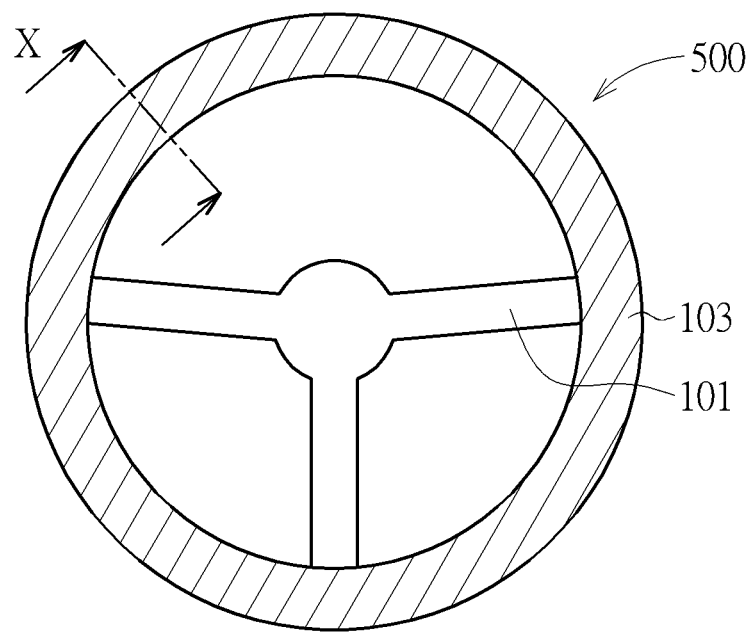
FIG. 5 is a schematic diagram illustrating a vehicle control system according to another embodiment of the present invention.
Figure 5:
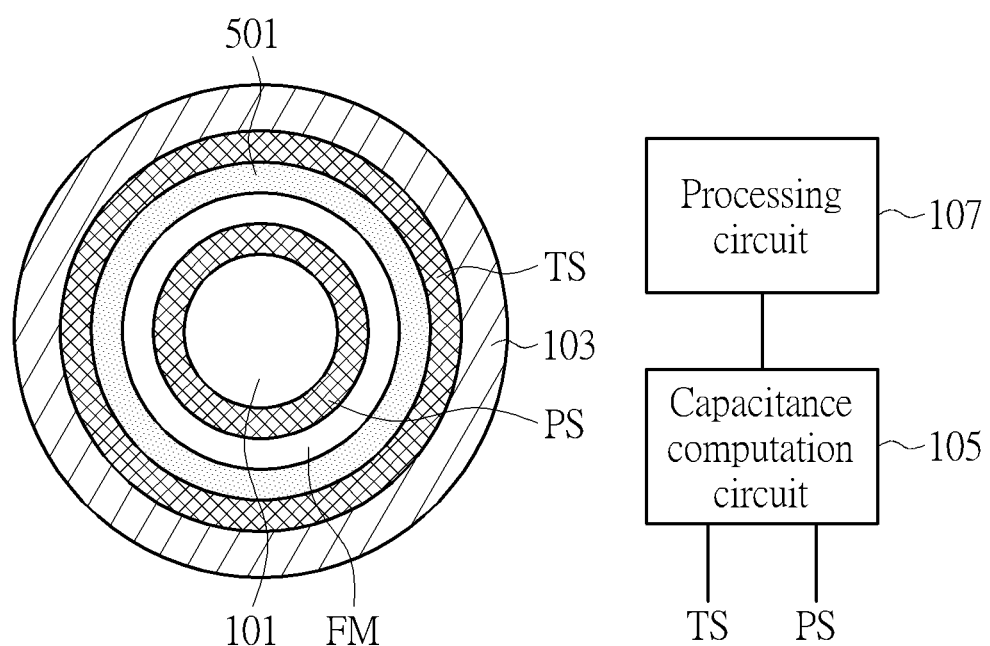

The structure of the steering wheel is not limited to the embodiment illustrated in FIG. 1. FIG. 5 is a schematic diagram illustrating a vehicle control system according to another embodiment of the present invention. As illustrated in FIG. 5, besides the frame work 101, the covering material 103, the capacitive touch sensor layer TS, the flexible material layer FM and the capacitive pressure sensor layer PS illustrated in FIG. 1, the steering wheel 500 further comprises a ground layer 501. The ground layer 501 is surrounding the flexible material layer FM and the capacitive touch sensor layer TS is surrounding the ground layer 501. In other words, the ground layer 501 is located between the capacitive pressure sensor layer PS and the capacitive touch sensor layer TS. The ground layer 501 is coupled to a predetermined voltage level, to operate as an active shielding layer for the capacitive touch sensor layer TS and the capacitive pressure sensor layer PS. In one embodiment, the predetermined voltage level is a ground voltage level of the whole vehicle. In one embodiment, the ground layer 501 further comprises a heating circuit such that the steering wheel can be heated via the heating circuit.

Figure 6:
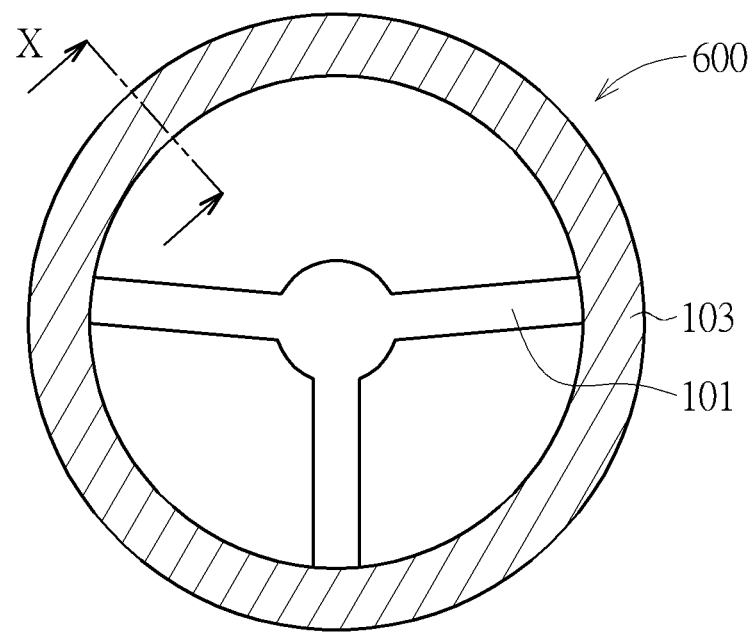
FIG. 6 is a schematic diagram illustrating a vehicle control system according to another embodiment of the present invention.
Figure 6:
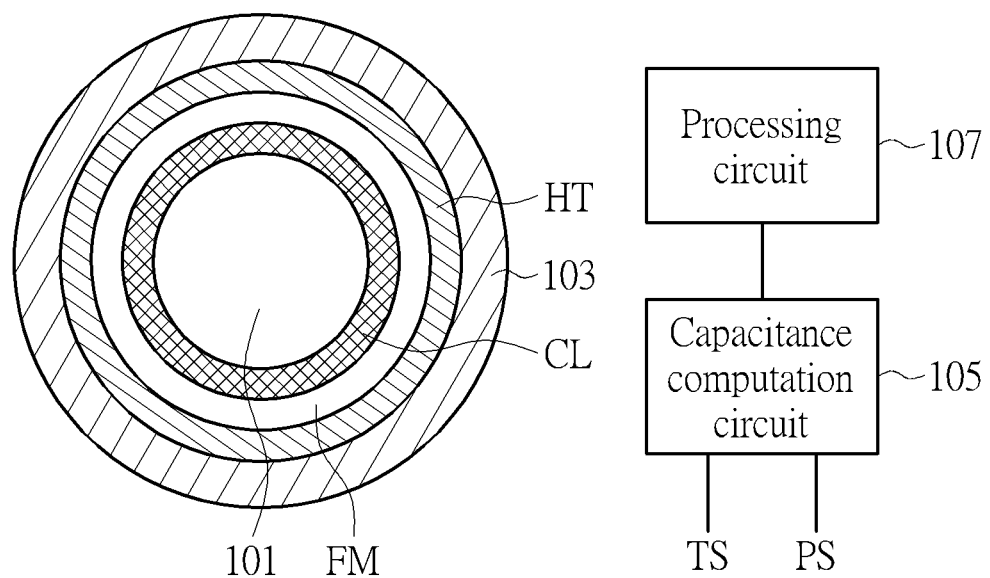

FIG. 6 is a schematic diagram illustrating a vehicle control system according to another embodiment of the present invention. As illustrated in FIG. 6, besides the frame work 101, the covering material 103, the flexible material layer FM illustrated in FIG. 1, the steering wheel 600 further comprises a heating layer HT and a combination layer CL. The combination layer CL is surrounding the frame work 101, the flexible material layer FM is the combination layer CL, the heating layer HT is surrounding the flexible material layer FM, and the covering material 103 is surrounding the heating layer HT.

The heating layer HT comprises the above-mentioned heating circuit which is configured to heat the steering wheel 600. Also, the heating layer HT also serves as the ground layer. In one embodiment, the metal lines of the heating circuit can couple to the ground voltage level when the metal lines are heated. In another embodiment, the heating function and the ground function can be provided in a time sharing manner. For example, the heating function is performed but the ground function is not performed in the time T1. On the opposite, the heating function is not performed but the ground function is performed in the time T2 different from the time T1. By this way, the cost can be reduced since the heating layer can also serve as a ground layer.

Additionally, in the embodiment of FIG. 6, the capacitive touch sensor layer TS and the capacitive pressure sensor layer PS are provided in the same combination layer CL. In other words, the above-mentioned first sensing electrodes, the first driving electrodes, the second sensing electrodes and the second driving electrodes are in the same layer. In one embodiment, the capacitive touch sensor layer TS and the capacitive pressure sensor layer PS operate in a time sharing manner. Thereby the sensing operations of the capacitive touch sensor layer TS and the capacitive pressure sensor layer PS do not interfere each other.

Figure 7:
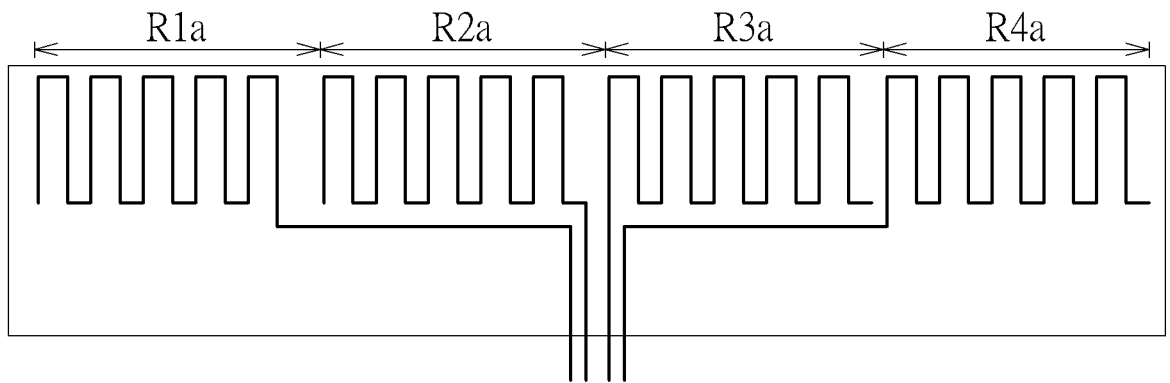
FIG. 7 and FIG. 8 are schematic diagrams illustrating the configurations of the electrodes of the capacitive pressure sensor layer and the capacitive touch sensor layer, according to different embodiments of the present invention.
Figure 8:
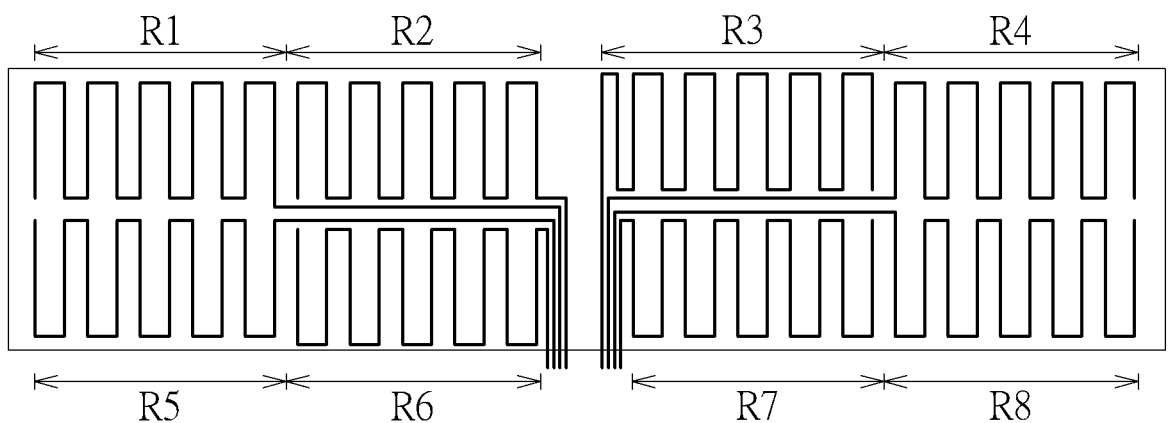

The configurations of the first sensing electrode, the first driving electrode, the second sensing electrode and the second driving electrode in above-mentioned embodiments can be changed corresponding to different requirements. FIG. 7 and FIG. 8 are schematic diagrams illustrating the configurations of the electrodes of the capacitive pressure sensor layer PS and the capacitive touch sensor layer TS, according to different embodiments of invention. The present electrodes in the embodiments of FIG. 7 and FIG. 8 are both self-capacitance structures. In such case, the above-mentioned first driving electrode and the first sensing electrode are the same electrode, and the above-mentioned second driving electrode and the second sensing electrode are the same electrode. Also, the electrodes in the embodiment of FIG. 7 are classified into four electrode regions R1a, R2a, R3a and R4a. Besides, the electrodes in the embodiment of FIG. 8 are classified into eight electrode regions R1, R2, R3, R4, R5, R6, R7 and R8. Via the plurality of electrode regions, the movement of the user's hand on the steering wheel 100 can be sensed. Please note, the configurations of the electrodes are not limited to the embodiments illustrated in FIG. 7 and FIG. 8. The above-mentioned electrode regions R1a, R2a, R3a, R4a, R1, R2, R3, R4, R5, R6, R7 and R8 can also be regarded as sensing regions.

Besides the self-capacitance structure illustrated in FIG. 7 and FIG. 8, the electrodes of the capacitive pressure sensor layer PS and the capacitive touch sensor layer TS can also have mutual capacitance structure. In such case, the above-mentioned first driving electrode and the first sensing electrode are different electrodes, and the above-mentioned second driving electrode and the second sensing electrode are different electrodes. Details about the self-capacitance structure and the mutual capacitance structure are well known by persons skilled in the art. For example, a US patent with a patent number of U.S. Pat. No. 9,684,418 clearly states the structures the self-capacitance structure and the mutual capacitance structure, thus descriptions thereof are omitted for brevity here.

Figure 9:
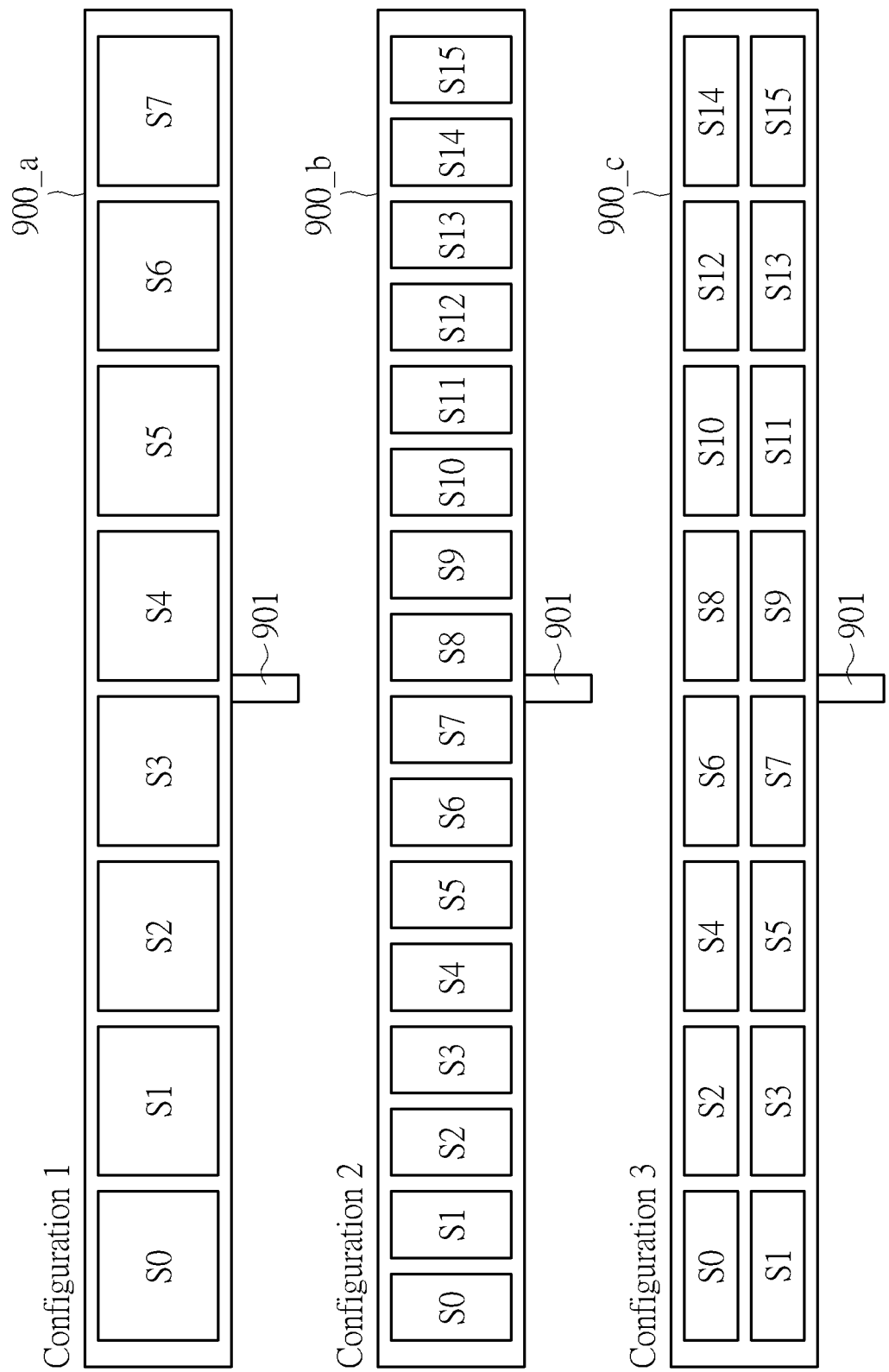
FIG. 9 is a schematic diagram illustrating the sensing regions illustrated in FIG. 7 and FIG. 8, according to one embodiment of the present invention.

FIG. 9 is a schematic diagram illustrating the sensing regions illustrated in FIG. 7 and FIG. 8, according to one embodiment of the present invention. As illustrated in FIG. 9, in the Configuration 1 and the Configuration 2, the sensor mat 901a and 901b respectively comprises sensing regions S1-S7 and sensing regions S1-S15, which are arranged in a single line. Also, in the Configuration 3, the sensor mat 901c comprises sensing regions S1-S15, which are arranged in two lines. Besides the sensing regions, the sensor mats 901a, 901b and 901c in FIG. 9 further respectively comprises a collection portion 901, which is configured to collect signal lines for electrodes in the sensing regions.

The sensing regions illustrated in FIG. 9 can be used for touch sensing or pressure sensing. If the sensing regions ii a sensor mat are all applied for touch sensing, the sensor mat is the above-mentioned capacitive touch sensor layer TS. For example, if the sensing regions S1-S7 of the sensor mat 900*a* are all applied for touch sensing, the sensor mat 900*a* is the above-mentioned capacitive touch sensor layer TS. Following the same rule, if the sensing regions S1-S15 of the sensor mat 900*b* are all applied for pressure sensing, the sensor mat 900*b* is the above-mentioned capacitive pressure sensor layer PS. Also, if some sensing regions in a single sensor mat are applied for touch sensing and other sensing regions in the same sensor mat are applied for pressure sensing, the sensor mat is the above-mentioned combination layer CL. For example, if the sensing regions S0, S2, S4, S6, S8, S10, S12, S14 of the sensor mat 900*c* are applied for touch sensing and the sensing regions S1, S3, S5, S7, S9, S11, S13, S15 of the sensor mat 900*c* are applied for pressure sensing, the sensor mat 900*c* is the above-mentioned combination layer CL. It will be appreciated that the configuration of sensing regions are not limited to the embodiments illustrated in FIG. 9. The configurations of sensing regions can be set corresponding to different requirements. For example, the sensing regions can be set corresponding to the size of the steering wheel or the manufacturing process of the sensor mat.

Figure 10:
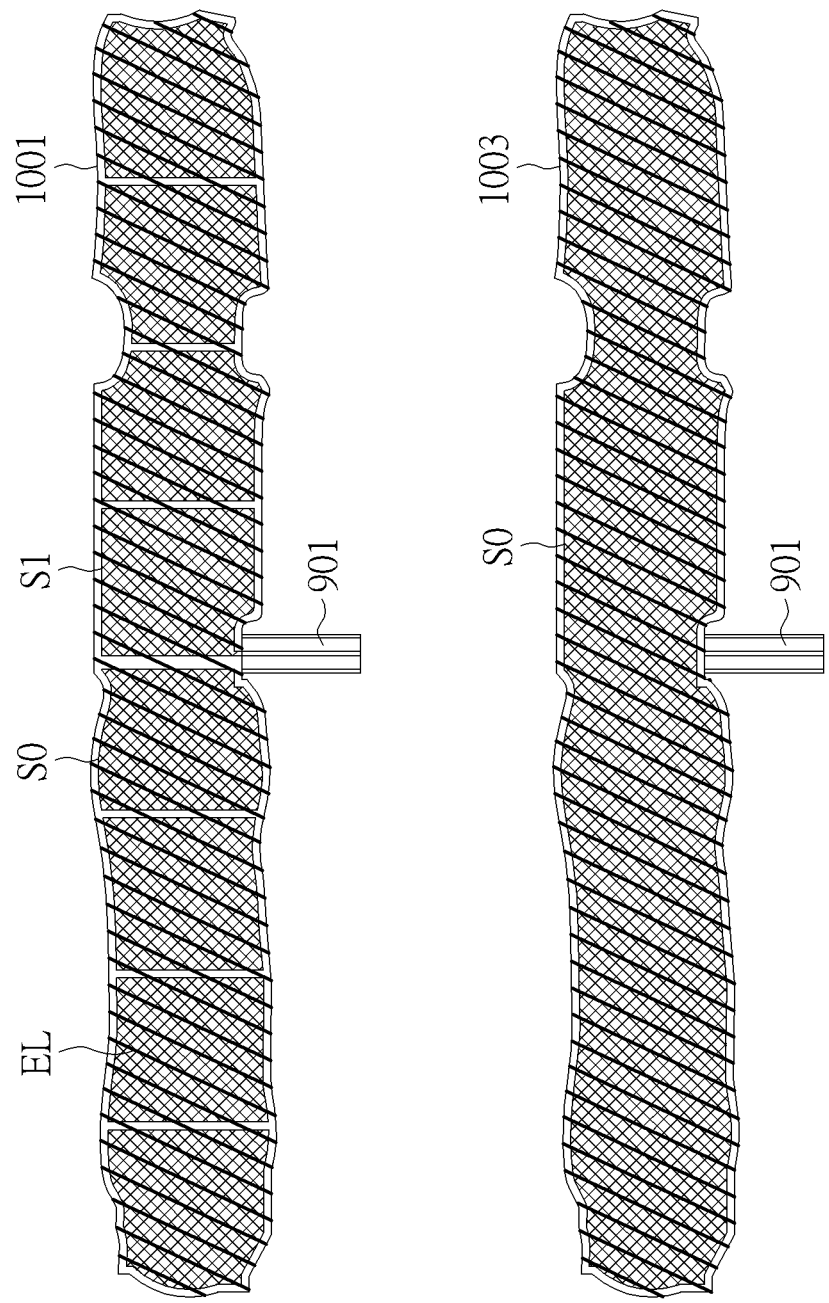
FIG. 10 is a schematic diagram illustrating practical examples of a sensor mat which comprises the sensing regions and electrodes illustrated in FIG. 7 and FIG. 8, according to one embodiment of the present invention.

FIG. 10 is a schematic diagram illustrating practical examples of a sensor mat which comprises the sensing regions and electrodes illustrated in FIG. 7 and FIG. 8, according to one embodiment of the present invention. In FIG. 10, the sensor mat 1001 comprises a plurality of sensing regions (only two sensing regions S0, S1 are symbolized), and each one of the sensing regions comprises the above-mentioned electrodes EL. Also, the sensor mat 1003 comprises only one sensing region S0.

AS above-mentioned, a steering wheel is provided as an example for explaining the concepts of the present invention. However, the concepts of the present invention can be implemented to any other vehicle control device of a vehicle. For example, if the vehicle is a carrier which uses a handle, such as a motorcycle, the vehicle control device is the handle. In such case, the above-mentioned pressure sensing device or the 3D gesture control system can be applied to the handle. Further, the concept of the present invention can be provided to any device which is not a vehicle control device. In such cases, the vehicle control system provided by the present invention can be regarded as a pressure sensing device or a 3D gesture control system.

In view of above-mentioned embodiments, the steering wheel has an extended application since it can sense pressure and touch rather than only touch.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pressure sensing device, comprising:
   a frame work;
   a capacitive pressure sensor layer, surrounding the frame work;
   a capacitive touch sensor layer;
   a flexible material layer, located between the pressure sensor layer and the touch sensor layer and surrounding the capacitive pressure sensor layer, wherein none of the flexible material layer located between the frame work and the capacitive pressure sensor layer;
   wherein the capacitive touch sensor layer is above the flexible material layer when the capacitive pressure sensor layer is below the flexible material layer;
   wherein the capacitive touch sensor layer has at least one first driving electrode and at least one first sensing electrode, which form a self-capacitance structure and are classified into a plurality of electrode regions for sensing movements of a hand;
   wherein the capacitive pressure sensor layer has at least one second driving electrode and at least one second sensing electrode, which form a self-capacitance structure and are classified to a plurality of electrode regions for sensing the movements of the hand; and
   a ground layer, wherein the ground layer is surrounding the flexible material layer and the capacitive touch sensor layer is surrounding the ground layer.

2. The pressure sensing device of claim 1, further comprising the ground layer located between the capacitive pressure sensor layer and the capacitive touch sensor layer.

3. A 3D gesture control system, comprising:
   a frame work;
   a capacitive pressure sensor layer, surrounding the frame work;
   a capacitive touch sensor layer;
   a flexible material layer, located between the pressure sensor layer and the touch sensor layer and surrounding the capacitive pressure sensor layer, wherein none of the flexible material layer located between the frame work and the capacitive pressure sensor layer;
   a processing circuit, configured to generate a control command according to at least one of the touch sensing signal and pressure sensing signal;
   wherein the capacitive touch sensor layer is above the flexible material layer when the capacitive pressure sensor layer is below the flexible material layer;
   wherein the capacitive touch sensor layer has at least one first driving electrode and at least one first sensing electrode, which form a self-capacitance structure and are classified into a plurality of electrode regions for sensing movements of a hand;
   wherein the capacitive pressure sensor layer has at least one second driving electrode and at least one second sensing electrode, which form a self-capacitance structure and are classified to a plurality of electrode regions for sensing the movements of the hand; and
   a ground layer, wherein the ground layer is surrounding the flexible material layer and the capacitive touch sensor layer is surrounding the ground layer.

4. The 3D gesture control system of claim 3, further comprising the ground layer located between the capacitive pressure sensor layer and the capacitive touch sensor layer.

5. The 3D gesture control system of claim 3, wherein the 3D gesture control system is a vehicle control system, wherein the processing circuit generates the control command according to at least one of following parameters: a location at which the hand presses the vehicle control system, a location at which the hand touches the vehicle control system, a time interval during which the hand presses the vehicle control system, a time interval during which the hand touches the vehicle control system, a moving direction of the hand on the vehicle control system, and a pressure level that the hand provides to the vehicle control system.

6. The 3D gesture control system of claim 5, comprising a vehicle control device comprising the frame work, the capacitive pressure sensor layer, the capacitive touch sensor layer, and the flexible material layer.

7. The 3D gesture control system of claim 5, wherein the processing circuit further generates the control command according to a gear of a vehicle comprising the vehicle control device.

8. The 3D gesture control system of claim 5, wherein the control command is applied for controlling a device of a vehicle comprising the vehicle control system.

9. The 3D gesture control system of claim 8, wherein the device is one of following devices: a lamp, a wiper, a seat, the vehicle control device.

10. The 3D gesture control system of claim 3, wherein the capacitive touch sensor layer and the capacitive pressure sensor layer are provided in a combination layer.

11. The 3D gesture control system of claim 3, further comprising:
a heating layer, configured to heat the 3D gesture control system;
wherein the heating layer also serves as a ground layer of the 3D gesture control system.

12. A vehicle control system for a vehicle, comprising:
a vehicle control device, comprising:
a frame work;
a capacitive pressure sensor layer, surrounding the frame work, configured to generate a pressure sensing signal;
a capacitive touch sensor layer, configured to generate a touch sensing signal;
a flexible material layer, located between the pressure sensor layer and the touch sensor layer and surrounding the capacitive pressure sensor layer, wherein none of the flexible material layer located between the frame work and the capacitive pressure sensor layer;
a processing circuit, configured to generate a control command according to at least one of the touch sensing signal and pressure sensing signal;
wherein the control command is applied for controlling a device of the vehicle;
wherein the capacitive touch sensor layer is above the flexible material layer when the capacitive pressure sensor layer is below the flexible material layer;
wherein the capacitive touch sensor layer has at least one first driving electrode and at least one first sensing electrode, which form a self-capacitance structure and are classified into a plurality of electrode regions for sensing movements of a hand;
wherein the capacitive pressure sensor layer has at least one second driving electrode and at least one second sensing electrode, which form a self-capacitance structure and are classified to a plurality of electrode regions for sensing the movements of the hand; and
a ground layer, wherein the ground layer is surrounding the flexible material layer and the capacitive touch sensor layer is surrounding the ground layer.

13. The vehicle control system of claim 12, wherein the vehicle control device further comprises the ground layer located between the capacitive pressure sensor layer and the capacitive touch sensor layer.

14. The vehicle control system of claim 12, wherein the processing circuit generates the control command according to at least one of following parameters: a location at which the hand presses the vehicle control system, a location at which the hand touches the vehicle control system, a time interval during which the hand presses the vehicle control system, a time interval during which the hand touches the vehicle control system, a moving direction of the hand on the vehicle control system, and a pressure level that the hand provides to the vehicle control system.

15. The vehicle control system of claim 12, wherein the processing circuit further generates the control command according to a gear of a vehicle comprising the vehicle control device.

16. The vehicle control system of claim 12, wherein the device is one of following devices: a lamp, a wiper, a seat, the vehicle control device.

17. The vehicle control system of claim 12, wherein the capacitive touch sensor layer and the capacitive pressure sensor layer are provided in a combination layer.

18. The vehicle control system of claim 12, further comprising:
a heating layer, configured to heat the vehicle control system;
wherein the vehicle control system also serves as a ground layer of the 3D gesture control system.

\* \* \* \* \*